United States Patent [19]

Hazard

[11] Patent Number: 5,153,581
[45] Date of Patent: Oct. 6, 1992

[54] METHOD FOR AUTHENTICATION BY AN EXTERNAL MEDIUM OF A PORTABLE OBJECT SUCH AS A MEMORY CARD COUPLED TO THIS MEDIUM

[75] Inventor: Michel Hazard, Mareil/Mauldre, France

[73] Assignee: Bull, S.A., Paris, France

[21] Appl. No.: 652,372

[22] PCT Filed: Feb. 7, 1991

Related U.S. Application Data

[63] Continuation of Ser. No. 449,415, Dec. 15, 1989, abandoned, which is a continuation of Ser. No. 165,992, filed as PCT/FR87/00221, Jun. 15, 1987, abandoned.

[30] Foreign Application Priority Data

Jun. 16, 1986 [FR] France .................. 86 08654

[51] Int. Cl.⁵ .................................. H04L 9/00
[52] U.S. Cl. ...................... 340/825.34; 340/825.3; 340/825.31
[58] Field of Search .......... 340/325.34, 825.3, 825.31; 235/380, 382, 382.5

[56] References Cited

U.S. PATENT DOCUMENTS

| | | |
|---|---|---|
| 3,789,605 | 3/1974 | Feistel . |
| 4,218,738 | 8/1980 | Matyas et al. . |
| 4,471,216 | 9/1984 | Herve . |
| 4,549,075 | 10/1985 | Saada et al. .............. 340/825.34 |
| 4,588,991 | 5/1986 | Atalla ........................ 340/825.31 |
| 4,590,470 | 5/1986 | Koenig ...................... 340/825.31 |
| 4,596,985 | 6/1986 | Bongard .................... 340/825.31 |
| 4,656,474 | 4/1987 | Mollier et al. ............ 340/825.34 |
| 4,679,236 | 7/1987 | Davies ............................ 235/382 |
| 4,683,968 | 8/1987 | Appelbaum et al. ...... 340/825.34 |
| 4,686,529 | 8/1987 | Kleefelds ................... 340/825.31 |
| 4,750,118 | 6/1988 | Heitschel et al. .......... 340/825.69 |
| 4,758,835 | 7/1988 | Rathmann et al. .............. 361/172 |
| 4,799,061 | 1/1989 | Abraham et al. .......... 340/825.34 |
| 4,885,778 | 12/1989 | Weiss .......................... 340/825.31 |
| 4,904,851 | 2/1990 | Yukino ....................... 340/825.34 |

FOREIGN PATENT DOCUMENTS 0028965 5/1981 European Pat. Off. .
0161181 11/1985 European Pat. Off. .

Primary Examiner—Donald J. Yusko
Assistant Examiner—Peter S. Weissman
Attorney, Agent, or Firm—Kerkam, Stowell, Kondracki & Clarke

[57] ABSTRACT

A method for authentication by an external medium of a portable object such as a standardized credit card coupled to this medium. The portable object (2) calculates a result (R) which is at least a function of a secret key (S) and of a variable datum (E). This result (R) is sampled by the external medium (1), which compares it with a reference result (RO). This result (RO) is changed in a random manner, by being replaced by a new result (RO) calculated by a portable object (2) which has been authenticated based on the preceding reference result.

9 Claims, 2 Drawing Sheets

METHOD FOR AUTHENTICATION BY AN EXTERNAL MEDIUM OF A PORTABLE OBJECT SUCH AS A MEMORY CARD COUPLED TO THIS MEDIUM

This is a continuation of application Ser. No. 449,415, field Dec. 15, 1989, now abandoned, which is a continuation of application Ser. No. 165,992, filed as PCT/FR87/00221, Jun. 15, 1987, now abandoned.

BACKGROUND OF THE INVENTION

The relates to a method for authentication by an external medium of a portable object, such as a memory card coupled to this medium.

More particularly, the invention applies to a case where the function of the external medium is to furnish a service or authorize access to a system via a card, but where, knowing that only some cards are authorized to cooperate with this external medium, the external medium must first determine that the card coupled to it has indeed been authorized from the outset rights to access this service.

Generally, the majority of applications using portable objects such as cards take into account at least one secret key that is specific to each application. On the one hand, this key is prerecorded in all the cards that are allowed to have access to this application, and on the other hand in all the items of equipment with which these cards can be connected in order for a service to be furnished or access authorized within the context of this application. These secret keys are known only to the authorizing entities that issue the cards and oversees the equipment that cooperates with these cards. In each of these applications, the equipment must first verify that the card indeed has the same secret key as its own, without moreover divulging in any way what the value of this key is.

This verification is typically effected by an exchange of information between the card and the equipment in the form of a dialogue, such as is described in French Patent 2 469 760 and corresponding U.S. Pat. No. 4,549,075 to Saada et al, for example.

According to this patent, the dialogue comprises externally inputting a random number into the card; causing the processing circuits of the card to calculate a result which is at least a function of this random number and of a secret key prerecorded in the card; extracting this result from the card; and comparing it with a result calculated by the equipment, which is at least a function of this same random number and of a secret key prerecorded in the equipment.

This verification or authentication of the card is confirmed, if the two results agree. It is understood that this agreement cannot be obtained unless the secret keys are identical.

To prevent any defrauder from making counterfeit cards, the secret nature of the keys used must absolutely be maintained, especially in the equipment that is accessible by the public, such as terminals. Generally, these keys are recorded in a memory zone which is then locked to prevent access to it from the outside, this zone being accessible only internally, by the processing circuits connected to this memory. However, it must be acknowledged that fraud, even though limited and technically difficult, is always possible, and that a defrauder will seek to discover the secret keys by sophisticated techniques, such as laser reading of the memory containing the keys.

SUMMARY OF THE INVENTION

To overcome this disadvantage, the invention no longer provides for the presence of a secret key in the equipment and instead replaces this key with a datum that is variable over time, while allowing the equipment to authenticate the cards that are allowed to cooperate with it.

The invention accordingly affords a method for authentication by an external medium of a portable object coupled to this medium of a kind comprising causing the processing circuits of the portable object to calculate a result which is at least a function of a secret key prerecorded in a memory of the portable object and of an external variable datum furnished by the external medium, characterized in that the invention comprises analyzing the similarities of this result with at least one previous result calculated by a portable object previously coupled with this external medium, this previous result having been calculated based on the same variable datum.

In another characteristic of the invention, the variable datum used is modified in a random manner, beginning with a portable object which is to be authenticated by the external medium.

In a major advantage of the invention, any equipment representing the external medium is made perfectly commonplace; that is, it contains no confidential or secret information at all.

Further characteristics, advantages and details will become apparent from the ensuing detailed description of an exemplary embodiment, taken in conjunction with the drawings.

DESCRIPTION OF PREFERRED EMBODIMENTS

Figure 1:
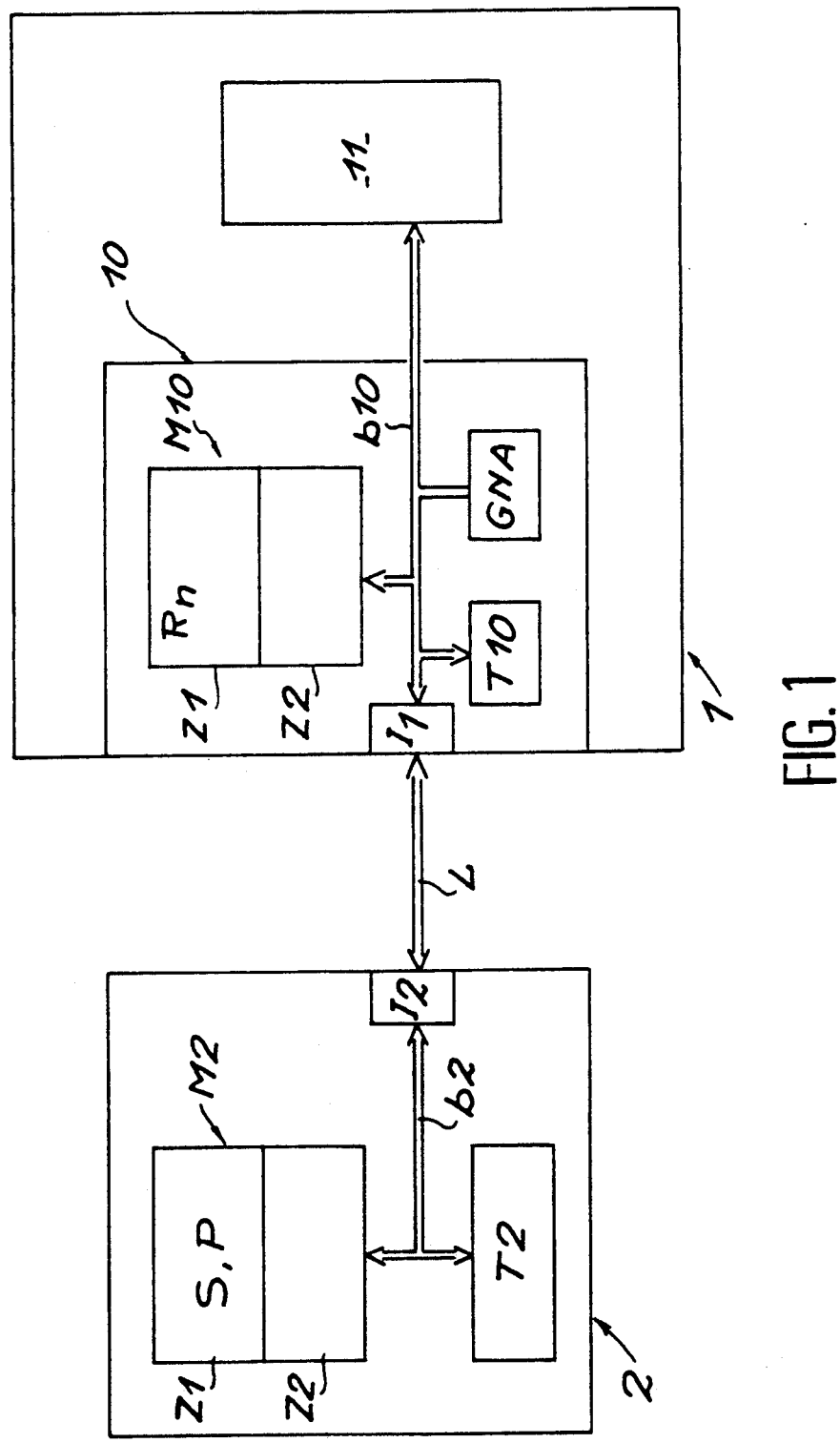
FIG. 1 schematically illustrates a first embodiment of a system using the method according to the invention.

The system shown in FIG. 1 comprises an external medium schematically represented by an item of equipment or terminal 1 and a portable object 2, which is temporarily coupled to the equipment 1 in order to allow the holder of the object to obtain access to a service, for example, or authorization of access to some other system (not shown) which is afforded by the external medium or equipment 1.

The equipment 1 comprises a control device 10 and a set of circuits 11 which are specific to the equipment as a function of the intended application.

The control device 10 comprises a memory M10, processing circuits T10, and a random number generator GNA, all connected to one another and to the circuits 11 via a control, data and address bus b10. The memory M10 is divided into at least two memory zones Z1, Z2. The memory zone Z1 contains data which, once written, are inaccessible except via the processing circuits T10, while the memory zone Z2 contains data which are accessible for reading from the outside and for reading and/or writing via the processing circuits T10.

The portable object 2, such as a memory card comprising a memory M2, for example of the programmable type, and processing circuits T2 such as a microprocessor, which are connected to one another via a control, data and address bus b2. The memory M2 of the card is again divided into at least two zones Z1, Z2, for which the conditions of access are identical to those for the memory M10 of the equipment 1. A card of this kind is described in particular in French Patents 2 401 459 and 2 461 301 of the present applicant.

Coupling between the card 2 and the equipment 1 is effected by means of an interface I1 on the part of the equipment and an interface I2 on the part of the card, these two interfaces being connected with one another, either locally or remotely, by a connection L. This kind of coupling device is described in particular in French Patent 2 483 713 of the present applicant.

The memory zones Z1 of the memory M2 of the card contains a secret key S which is specific to the service or services that can be obtained with this card 2.

According to the invention, no secret key S at all is recorded in the items of equipment 1 that are intended for cooperation with the cards 2 having the secret key S.

Referring to the embodiment shown in FIG. 1, the manner in which the equipment 1 can nevertheless authenticate a card 2 having a secret key S and being coupled to the equipment 1 will now be described.

The equipment 1 transmits a random number E to the card 2. The processing circuits T2 of the card 2 execute a program P that is prerecorded in the memory zone Z1. This program P takes into account at least the random number E and the secret key S to arrive at the calculation of a result R such that:

$$R = f(E, S)$$

This result R thus calculated is then transmitted to the control device 10 of the equipment 1, which will now analyze this result in order to authenticate the validity of the card 2.

To do so, let it be supposed that n cards have respectively calculated n previous results Ra, which have been recorded in succession in the memory zone Z1 of the control device 10. Now let it be supposed also that these n results have all been calculated based on the same random number E, which once it has been drawn by the generator GNA is recorded in the memory zone Z2 of the memory M10 of the control device 10.

The operation of authentication of the card 2 will now comprise comparing the result R with the previous results Ra. In practice, four cases are possible.

In the first two cases, it is supposed that all the previous results Ra are identical, that is, that they have all been calculated by cards having the same secret key S and based on the same random number E.

In the first case, the result R is identical to each of the results Ra. The control device 10 then considers the card 2 to be identical, records the result R, which becomes a previous result Ra, and authorizes the equipment 1 to furnish the service by validating the functioning of all of the circuits 11.

In the second case, the result R is different from each of the results Ra. The control device 10 then considers the card 2 to be a counterfeit card and prevents the functioning of the circuits 11.

In the third and fourth cases, it is assumed that the previous results Ra are not all identical, that is, that they have been calculated based on different secret keys S.

In these different cases examined above, it has been noted that the different results R calculated by the cards 2 are recorded in the memory M10 of the control device. To save space in the memory, it is advantageous not to record a plurality of identical results, but instead, a first time, to record a result R differing from some other one, and after that to use counters that are incremented each time a new result R is identical to a result already recorded.

It is prudent to perform a supplementary monitoring on each user card 2 to avoid allowing the same card, in particular a counterfeit card, to be coupled to the equipment repeatedly in succession in an attempt to cause the equipment 1 to decide that the previous identical results Ra calculated by the card 2 are authentic and originate in n different valid cards. This monitoring may comprise causing the recording by the equipment 1 of a datum assigned to the carrier, such as the serial number of the card, in order to monitor the number of times that the same card has been coupled with the equipment.

This above-described functioning supposes that the first cards 2 that are coupled to the equipment 1, and in particular the first card, will be rejected or accepted automatically, since the control device 10 has not yet recorded a previous result Ra or has not recorded enough results Ra to decide on the validity of the card.

Figure 2:
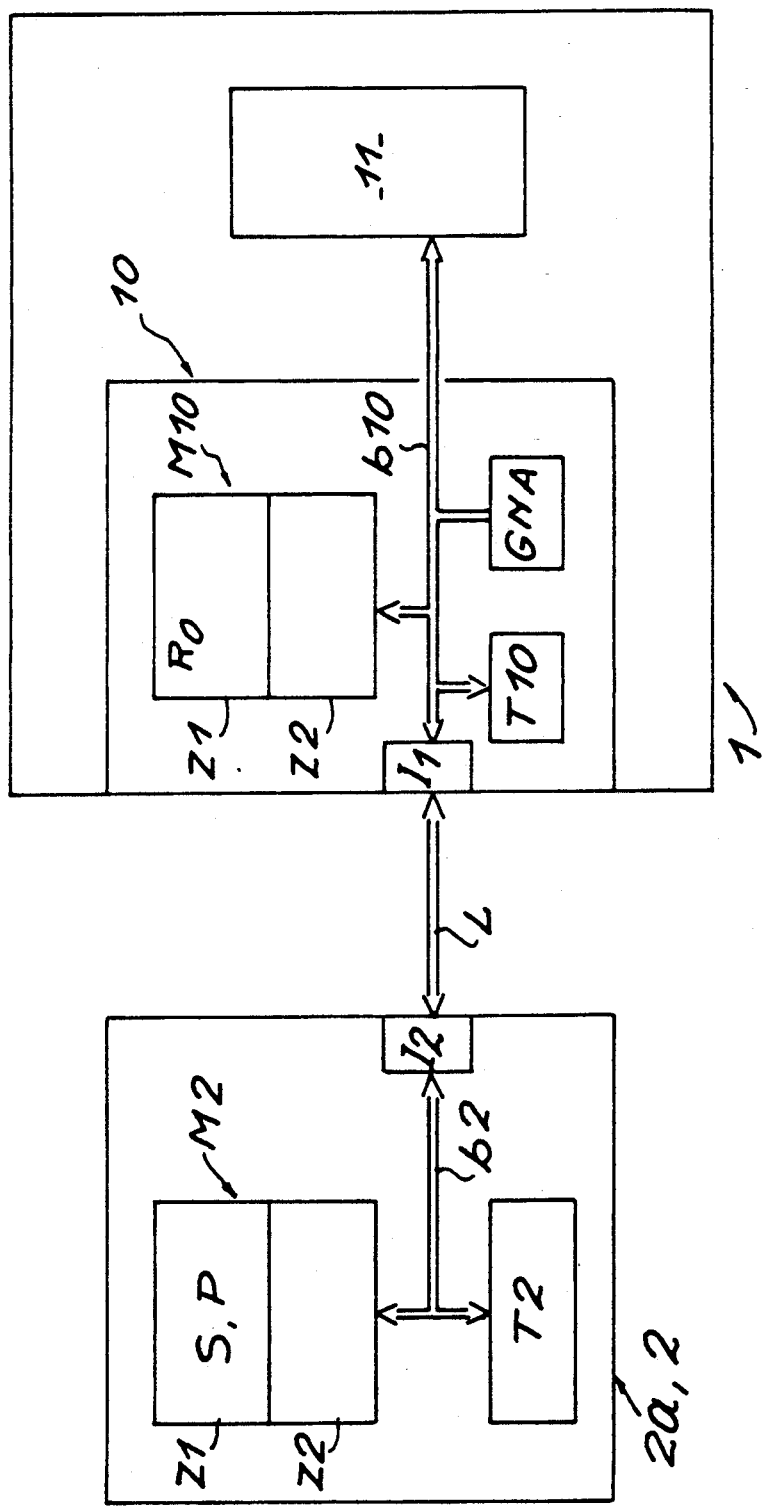
FIG. 2 schematically illustrates a second embodiment of a system for performing the method according to the invention.

This problem is solved by the second embodiment shown in FIG. 2. When the equipment 1 is put into service, a reference result R0 is calculated by a reference card 2a put at the disposition of the authorizing entity that oversees the various items of equipment 1. By definition, this card 2a has the same secret key S as all the cards 2 issued by this entity that give access to the items of equipment 1.

The card 2a of FIG. 2 is of the same type as the card 2 of FIG. 1. An authorized person couples the card 2a to the equipment 1, the generator GNA of which draws a random number E which is transmitted to the card 2a. The processing circuits T2 of the card 2a calculate a reference result R0 in the same manner as the calculation of a result R. This result R0 is recorded in the memory zone Z1 of the memory M10 of the control device 10. Then, each result R calculated by a card 2 will be compared uniquely to this reference result R0. In this case, it is unnecessary to record the results calculated by the various cards 2 into the memory M10 of the control device.

In an important characteristic of the invention, the random number E is changed as a precaution. This change does not occur at regular time intervals, but instead after n cards, for example, have been coupled with the equipment, this number n itself being variable. Changing the random number E requires the calculation of a new reference result R0. For this calculation, it can be imagined that the reference card 2a used beforehand for the initialization can be used. This solution is not satisfactory, because it means that each time there is to be a change, an authorized person in possession of this card 2a must physically go to each item of equipment 1.

Advantageously, the invention very simply provides the calculation of the new reference result R0 by a user card 2, which has just been declared authentic on the basis of the preceding reference result R0. This avoids having to use a reference card 2a.

More precisely, at the nth card 2 that is declared to be authentic (n being variable), the generator GNA of the equipment 1 draws a new random number E, which is transmitted to the card 2, the microprocessor T2 of which calculates the new reference result R0, which is then recorded in the memory M10 of the equipment 1, as is the random number E that has just been drawn.

The equipment 1 in accordance with the principle of the invention makes it possible to authenticate the cards 2 via secret keys as recorded in these cards, without either knowing or recalculating the value of these keys, yet only cards having the same secret key S can be authenticated. It is also possible for the equipment 1 to be capable of overseeing a plurality of results associated with a plurality of different secret keys S and thus to authenticate a plurality of families of cards, each family having predetermined secret key capable of being identified by the equipment 1.

I claim:

1. A method of authenticating by an external medium of a portable object coupled to the external medium, the external medium (1) comprising first processing circuits (T10) and a first memory (M10) and the portable object (1) comprising second processing circuits (T2) and a second memory (M2), the method comprising furnishing a variable datum (E) from the eternal medium to the portable object; calculating by the second processing circuits of the portable object a result (R) which is a predetermined function of a secret key (S) prerecorded in the second memory of the portable object and of the variable datum (E) furnished by the external medium; transferring the result (R) to the external medium; comparing, in the external medium, the result (R) with a previous result (Ra) recorded in the first memory and previously calculated by a portable object (2) previously coupled to the external medium, this previous result (Ra) having been calculated as said predetermined function of the same secret key (5) and the same variable datum (E); authenticating the portable object in response to said comparing; the method further comprising:

calculating initially a reference result (R0) as said predetermined function of the secret key and the variable datum (E); recording the reference result (R0) in the first memory (M10) of the external medium; authenticating a plurality of other portable objects subsequently coupled to the external medium, and each having the same secret key (S), by requiring a result (R) calculated by each such portable object using said variable datum (E) to be equal to the reference result (R0), and wherein said calculating initially the reference result (R0) comprises calculating the reference result by a portable reference object (2a) in the possession of an authorized person and coupled to the external medium, the method further comprising changing the variable datum (E) after the coupling of n portable objects, and calculating, upon said changing of the variable datum, a new reference result (R0) based on the changed variable datum, such calculating being performed by the n th portable object (2) following authentication of said n th portable object based on a preceding reference result.

2. A method as defined by claim 1, wherein said furnishing comprises obtaining the variable datum (E) from a random number generator (GNA) of the external medium (1).

3. A method as defined by claim 1, further comprising changing the variable datum (E) after the coupling of n portable objects, n itself being variable.

4. A method as defined by claim 1 further comprising storing said variable datum in the first memory of the external medium, and wherein said transferring comprises transferring said variable datum to subsequent portable objects coupled to the external medium for authentication.

5. A method as defined by claim 1 further comprising storing data corresponding to each result and reference result in the first memory of said external medium.

6. A method of authenticating a portable object having a secret key (S) prerecorded therein and first processing circuits for performing a predetermined processing function by a terminal having a memory and second processing circuits, the method comprising furnishing from the memory of the terminal to the portable object a random datum (E); calculating in the portable object as said predetermined function of the secret key prerecorded in the portable object and the random datum a first result (R); transferring the first result to the terminal; comparing in the second processing circuits of the terminal the first result with a second result (Ra) previously calculated by a portable object previously coupled to the terminal as said predetermined function of the same secret key and the same random datum and stored in the memory of the terminal; and authenticating the portable object upon said first and second results matching, wherein a plurality n of portable objects are authenticated using the same random datum, and the method further comprises, following authentication of an n th portable object, generating a new random datum; furnishing the new random datum to the n th portable object; calculating in the n th portable object a new result as said predetermined function of the secret key and the new random datum; transferring the new result to the terminal; and storing the new result in the memory in the terminal.

7. A method as defined by claim 6 further comprising authenticating a plurality of portable objects by repeating said furnishing, calculating, transferring, and comparing for each of said plurality of portable objects using the same random datum.

8. A method as defined by claim 6, wherein the secret key prerecorded in the portable object is not stored in said terminal, and wherein the second processing circuits of the terminal do not perform said predetermined function preformed by the first processing circuits of the portable object.

9. A method as defined by claim 6 further comprising storing the new random datum in the memory in the terminal for transfer to a subsequent portable object coupled to the terminal.

* * * * *

UNITED STATES PATENT AND TRADEMARK OFFICE
CERTIFICATE OF CORRECTION

PATENT NO. : 5,153,581
DATED : October 6, 1992
INVENTOR(S) : Michel HAZARD

It is certified that error appears in the above-indentified patent and that said Letters Patent is hereby corrected as shown below:

On the title page, the Related U.S. Application Data should read as follows:

-- [63] Continuation of Ser. No. 449,415, Dec. 15, 1989, abandoned, which is a continuation of Ser. No. 165,992, Feb. 12, 1988, filed as PCT/FR87/00221, June 15, 1987, abandoned.--

Col. 5, line 26, (Claim 1, line 7) - "eternal" should be -- external --.

Signed and Sealed this

Tenth Day of May, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,153,581
DATED : October 6, 1992
INVENTOR(S) : Michel HAZARD

It is certified that error appears in the above-indentified patent and that said Letters Patent is hereby corrected as shown below:

On the cover page, the Assignee "BULL, S.A., Paris, France" should be --BULL CP8, Trappes, France --.

Signed and Sealed this

Twenty-eight Day of March, 1995

Attest:

BRUCE LEHMAN

*Attesting Officer*     *Commissioner of Patents and Trademarks*